United States Patent
Li et al.

(10) Patent No.: US 9,870,485 B2
(45) Date of Patent: Jan. 16, 2018

(54) SYSTEM AND METHOD FOR DETECTING SENSITIVE USER INPUT LEAKAGES IN SOFTWARE APPLICATIONS

(71) Applicant: NEC Laboratories America, Inc., Princeton, NJ (US)

(72) Inventors: Zhichun Li, Princeton, NJ (US); Xusheng Xiao, Highland Park, NJ (US); Zhenyu Wu, Plainsboro, NJ (US); Jianjun Huang, Lafayette, IN (US); Guofei Jiang, Princeton, NJ (US)

(73) Assignee: NEC Corporation, Tokyo (JP)

( * ) Notice: Subject to any disclaimer, the term of this patent is extended or adjusted under 35 U.S.C. 154(b) by 168 days.

(21) Appl. No.: 14/939,366

(22) Filed: Nov. 12, 2015

(65) Prior Publication Data
US 2016/0132679 A1   May 12, 2016

Related U.S. Application Data

(60) Provisional application No. 62/078,552, filed on Nov. 12, 2014.

(51) Int. Cl.
*G06F 21/57* (2013.01)
*G06F 21/62* (2013.01)

(52) U.S. Cl.
CPC ........ *G06F 21/6245* (2013.01); *G06F 21/577* (2013.01)

(58) Field of Classification Search
CPC ........ G06F 21/00; G06F 21/57; G06F 21/577; G06F 21/6245; G06F 21/82
See application file for complete search history.

(56) References Cited

U.S. PATENT DOCUMENTS

| | | | | |
|---|---|---|---|---|
| 6,662,340 B2 * | 12/2003 | Rawat | ............. | G06F 17/243 705/34 |
| 8,875,298 B2 | 10/2014 | Li et al. | | |
| 9,104,867 B1 * | 8/2015 | Thioux | ............. | G06F 21/56 |
| 2004/0135808 A1 * | 7/2004 | Sagara | ............. | G05B 19/409 715/762 |

(Continued)

OTHER PUBLICATIONS

Pocatilu et al. "An UI Layout Files Analyzer for Test Data Generation" [Online], Jul. 8, 2014 [Retrieved on: Jun. 22, 2017], retrieved from < http://revistaie.ase.ro/content/70/06%20-%20Pocatilu,%20Alecu.pdf >.*

(Continued)

*Primary Examiner* — Eric W Shepperd
(74) *Attorney, Agent, or Firm* — Joseph Kolodka

(57) ABSTRACT

A system and method for detecting sensitive user input leakages in software applications, such as applications created for smartphone platforms. The system and method are configured to parse user interface layout files of the software application to identify input fields and obtain information concerning the input fields. Input fields that contain sensitive information are identified and a list of sensitive input fields, such as contextual IDs, is generated. The sensitive information fields are identified by reviewing the attributes, hints and/or text labels of the user interface layout file. A taint analysis is performed using the list of sensitive input fields and a sink dataset in order to detect information leaks in the sensitive input fields.

17 Claims, 5 Drawing Sheets

(56) References Cited

U.S. PATENT DOCUMENTS

| | | | | |
|---|---|---|---|---|
| 2007/0244761 A1* | 10/2007 | Scipioni | G06F 21/64 | 705/18 |
| 2012/0151389 A1* | 6/2012 | Bishop | G06F 9/4443 | 715/763 |
| 2012/0311471 A1* | 12/2012 | Bullard | G06F 3/048 | 715/765 |
| 2014/0282133 A1* | 9/2014 | Engel | G06F 8/38 | 715/763 |
| 2014/0298302 A1* | 10/2014 | Santhanakrishnan | G06F 11/3604 | 717/132 |
| 2015/0279070 A1* | 10/2015 | Nandakumar | G06F 9/4443 | 345/646 |
| 2015/0370447 A1* | 12/2015 | Jitkoff | G06F 3/0482 | 715/835 |

OTHER PUBLICATIONS

Coyier, Chris "Absolute Positioning Inside Relative Positioning" [Online], Jun. 16, 2008 [Retrieved Jun. 24, 2017], Retrieved from < https://css-tricks.com/absolute-positioning-inside-relative-positioning/ >.*

Yang, Z. et al., "AppIntent: Analyzing Sensitive Data Transmission in Android for Privacy Leakage Detection" CCS'13, (Nov. 4-8, 2013) pp. 1-12.

Cai, L. et al., "On the Practicality of Motion Based Keystroke Inference Attack" Trust and Trustworthy Computing (2012) pp. 273-2960, vol. 7344: Lecture Notes in Computer Science.

Zheng, C. et al., "SmartDroid: an Automatic System for Revealing UI-based Trigger Conditions in Android Applications" SPSM'12 (Oct. 19, 2012) pp. 93-104.

Lu, L. et al., "CHEX: Statically Vetting Android Apps for Component Hijacking Vulnerabilities" CCS'12 (Oct. 16-18, 2012) pp. 229-240.

Enck, W. et al., "TaintDroid: An Information-Flow Tracking System for Realtime Privacy Monitoring on Smartphones" 9th USENIX Symposium on Operating Systems Design and Implementation (OSDI'10) (Oct. 2010) pp. 1-15, Article No. 1-6.

Pandita, R. et al., "WHYPER: Towards Automating Risk Assessment of Mobile Applications" SEC'13 Proceedings of the 22nd USENIX conference on Security (Aug. 2013) pp. 1-16.

* cited by examiner

SYSTEM AND METHOD FOR DETECTING SENSITIVE USER INPUT LEAKAGES IN SOFTWARE APPLICATIONS

RELATED APPLICATION INFORMATION

This application claims priority to provisional application Ser. No. 62/078,552 filed on Nov. 12, 2014, incorporated herein by reference.

BACKGROUND

Technical Field

The present invention relates to computer systems, and more particularly, systems and methods for detecting sensitive user input leakages in software applications.

Description of the Related Art

Software applications are widely used for computerized devices, such as smartphones. To date, more than 1 million software applications have been developed for smartphones. Many of these software applications require the user to input sensitive data. The sensitive data input into a software application is vulnerable to being leaked. For example, the sensitive data may be stored in certain areas on a smartphone that could be accessed by other software applications on the device. This information may then be accessed by malware applications which may then leak the user's sensitive information.

Therefore, a system and method to detect the leaking of sensitive user inputs in software applications would be highly advantageous. The system and method would enable the user to avoid using software applications which are identified as leaking sensitive user inputs in order to provide improved privacy and security for the user.

SUMMARY

A method for detecting sensitive user input leakages in a software application which includes the steps of parsing a user interface layout file of the software application to identify input fields and obtaining information concerning the input fields from the user interface layout file. The method further includes the step of identifying input fields that include sensitive information and generating a list of sensitive input fields. The method further includes the step of performing a taint analysis based on the list of sensitive input fields. The method includes the step of detecting information leaks in the sensitive input fields. The method further includes the step of notifying a user of information leaks in the sensitive input fields to avoid use of the software application by the user.

A system for detecting sensitive user input leakages in a software application includes a processor, memory and an interface. The memory is configured to store a layout parsing module which parses a user interface layout file of the software application to identify input fields and obtain information concerning the input fields from the user interface ("UI") layout file. The memory also stores an identification module which identifies input fields that contain sensitive information and generates a list of sensitive input fields. The memory also stores a taint analysis module which detects information leaks in the sensitive input fields based on the list of sensitive input fields and notifies a user of information leaks in the sensitive input fields to avoid use of the software application by the user.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In accordance with the present principles, systems and methods are provided for detecting sensitive user input leakages in software applications, such as applications created for smartphone platforms. The system and method are configured to scalably detect sensitive user input leakages on smartphone platforms by identifying user inputs which receive sensitive information on the user interface of a software application. The system and method are configured to perform a static taint analysis on the sensitive user inputs in order to detect leaks. The static analysis does not require user intervention in order to correctly detect sensitive user input leakages in the software applications.

Embodiments described herein may be entirely hardware, entirely software or may include both hardware and software elements which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Figure 1:
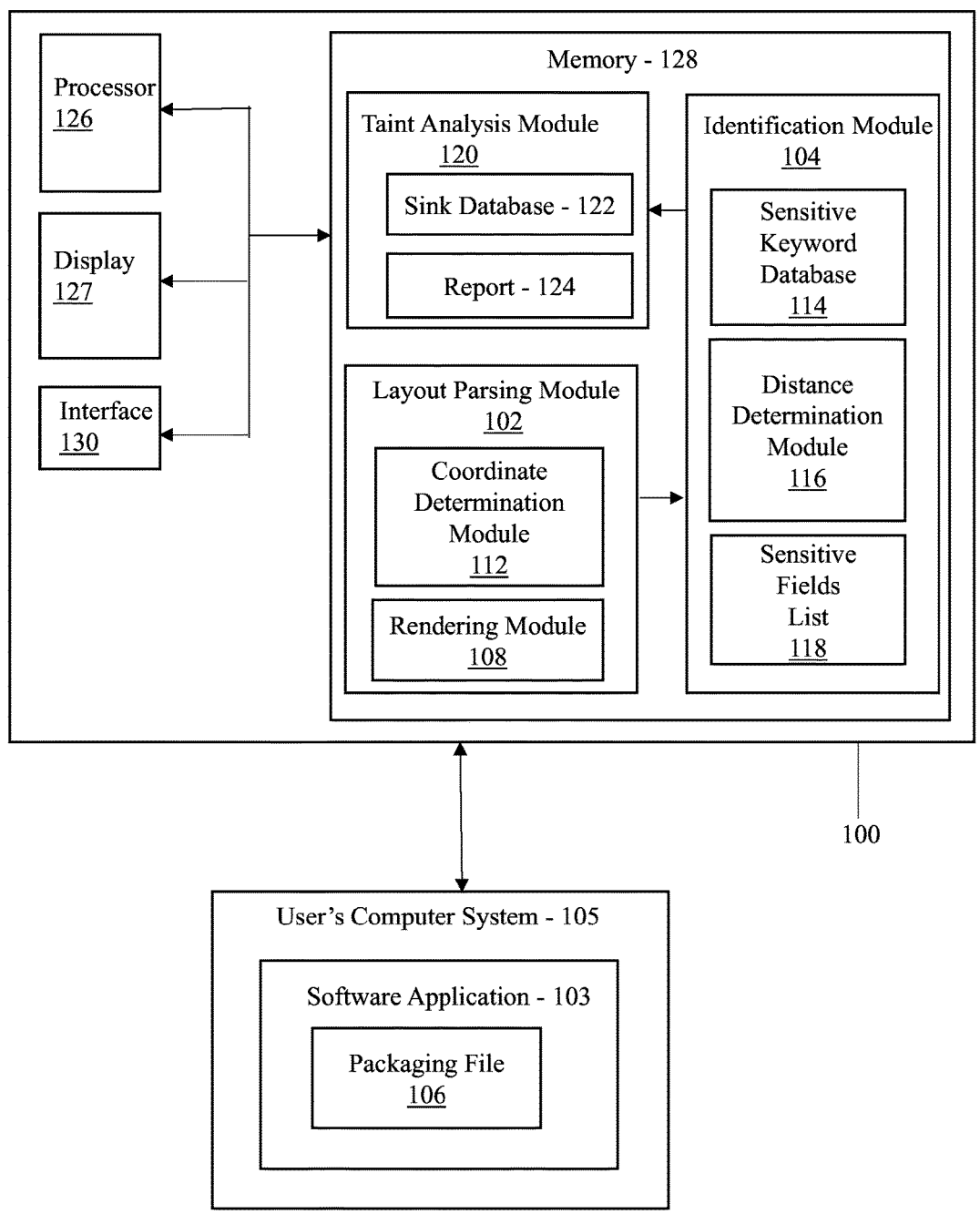
FIG. 1 is a block/flow diagram illustratively depicting a system for detecting sensitive user input leakages in accordance with the present principles.

Referring now to the drawings in which like numerals represent the same or similar elements and initially to FIG. 1, a block/flow diagram depicting a system 100 for detecting sensitive user input leakages in software applications 103, is illustratively shown in accordance with one embodiment of the present principles. The system 100 may include one or more processors 126 and memory 128 for storing programs and applications. A display 127 permits a user to view images and interact with the system 100. The system 100 may further include an interface 130 which may feature a keyboard, mouse, a joystick, a haptic device, or any other peripheral or control to permit user feedback from and interaction with the system 100.

Figure 3:
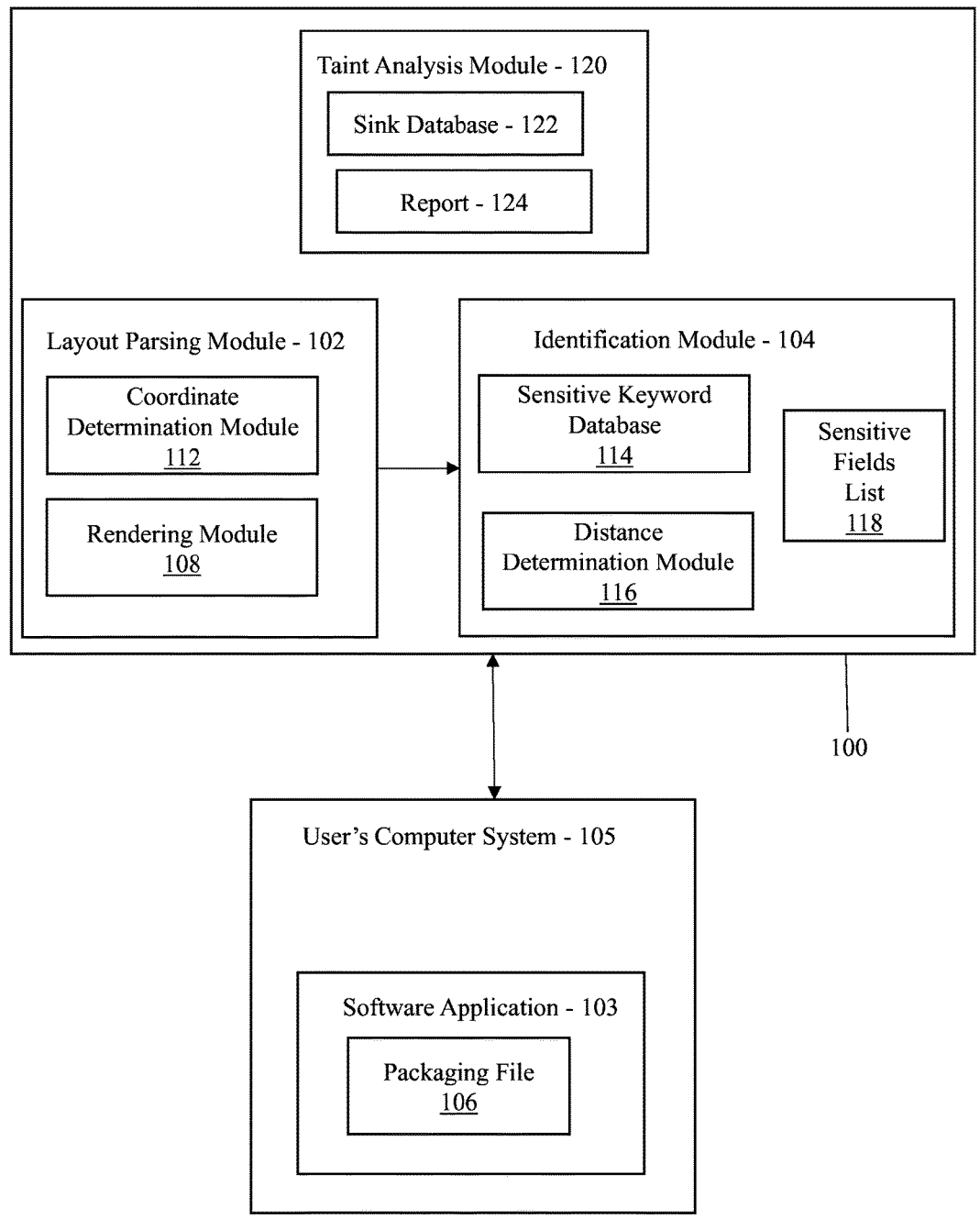
FIG. 3 is a block/flow diagram illustratively depicting a workflow for detecting sensitive user input leakages in accordance with another illustrative embodiment of the present principles.

FIG. 3 shows a workflow for detecting sensitive user input leakages in software applications. As shown in FIGS. 1 and 3, the system 100 may include a layout parsing module 102 which is configured to parse the UI layout of the software applications 103 on the user's computer system 105. In one embodiment, the layout parsing module 102 may be configured to receive a packaging file 106 for the software application, such as an Android Package Kit ("APK"). file for a software application for the ANDROID™ operating system.

The layout parsing module 102 may be configured to render the UIs of the software application and extract information concerning the input fields. The layout parsing module 102 may be configured to identify input fields in the UI layout file for the software application 103.

In one embodiment, the user's computer system 105 may preferably be a smartphone. Unlike personal computer applications which typically employ heterogeneous approaches for composing UIs, smartphone applications generally feature a unified approach in defining UIs. The unified approach often utilizes a declarative language to describe the UI layout of the software application. This unified approach for defining UIs for smartphone development platforms enables developers to easily construct the front end of an application. For example, software application developers for the WINDOWS™ smartphone platform may utilize Security Assertion Markup Language ("SAML") or Hypertext Markup Language ("HTML")code to define UI pages. Additionally, the development kits for the ANDROIDTM operating system provide an Extensible Markup Language ("XML") language for developers to define the UIs of the software applications.

The general structure of a software application is standardized for each smartphone operating system. For example, an ANDROID™ software application generally consists of multiple activities wherein each activity is an application component that provides a window to draw a UI. The UI is defined by the UI layout file which specifies the sizing, spacing and placement of the content within the window. The UI layout file consists of various interactive graphical user interface ("GUI") widgets, including input fields and buttons. The UI layout file also consists of various layout models. An example of a simplified UI layout file for the ANDROID™ operating system is shown below as Example 1.

EXAMPLE 1

1<LinearLayout android:orientation="vertical">
2<TextView android:id="@+id/lbl_password"
    android:text="@string/tip_password_please"/>
3<LinearLayout android:orientation="horizontal">
4<EditText android:id="@+id/txt_password1"
    android:inputType="textPassword"/>
5<EditText android:id="@+id/txt_password2"
    android:inputType="textPassword"/>
6<EditText android:id="@+id/txt_password3"
    android:inputType="textPassword"/>
7<EditText android:id="@+id/txt_password4"
    android:inputType="textPassword"/>
8</LinearLayout>
9</LinearLayout>

When the software application is run, the ANDROID™ framework parses the UI layout file and determines how to visualize and place the GUI widgets in the window by reviewing the layout models and the relevant attributes of the GUI widgets in the UI layout file. These homogenous, standardized approaches for smartphone software applications allow the system 100 to statically detect sensitive user input leakages in a scalable manner.

The layout parsing module 102 is configured to identify which layout files contain input fields, such as input boxes, by parsing the layout files. For instance, in one embodiment, the layout parsing module 102 may be configured to determine all input fields of the type EditText and all possible sub-types, including custom widgets, in the software application as being input fields. The layout parsing module 102 may be configured to generate a list of layout files which contain input fields. The layout parsing module 102 is also configured to extract the class hierarchy from the application and obtain information concerning the input fields. This information preferably includes attributes, hints, text labels and absolute coordinates.

The layout parsing module 102 includes a rendering module 108 that is configured to render the UIs of the software application in a manner that simulates the UI being dynamically rendered. This allows the rendered UI to mimic how the user would view the UI generated by the UI layout file. In one embodiment, the rendering module 108 is based upon a rendering engine from a development kit for the operating system which is configured to render the UI independently from the software application code. For instance, FIG. 2 shows an illustrative example of the UI model 109 rendered by the rendering module 108 from the layout file in Example 1.

The layout parsing module 102 may include a coordinate determination module 112 which may be configured to determine the absolute coordinates of the text labels of the UI and input fields. As an example, the UI model rendering in FIG. 2, is arranged in a tree-like structure which consists of GUI elements, including layout models and GUI widgets. The coordinates for each GUI element are specified relative to its parent container. Therefore, the coordinate determination module 112 is configured to compute the absolute coordinates based on the relative coordinates and the parent container's known absolute coordinates.

Figure 2:
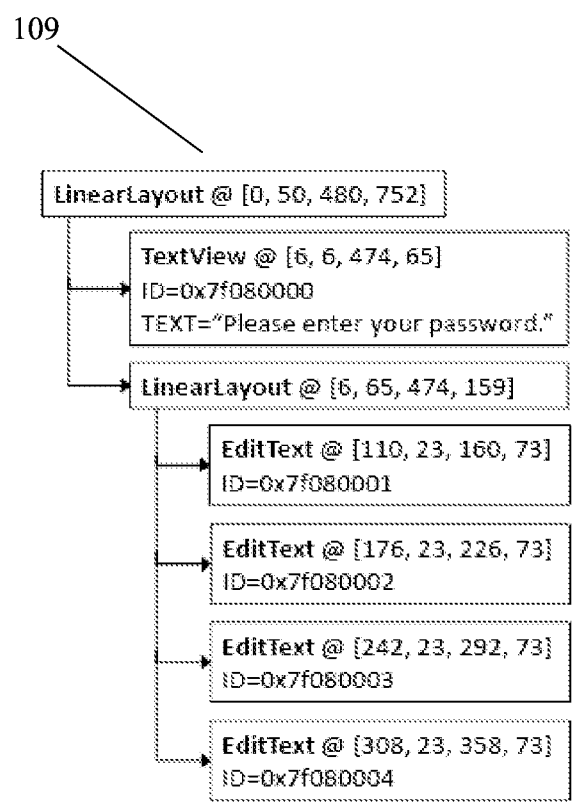
FIG. 2 is an illustrative example of a user interface model rendered by the rendering module of the layout parsing module in accordance with the present principles.

For instance, in the example shown in FIG. 2, the root element is LinearLayout having coordinates of (0, 50, 480, 752). Since this is the root GUI element, its coordinates are relative to the top left corner of the screen and are already absolute coordinates. The other GUI elements are child elements. For example, the second GUI element is TextView having coordinates of (6, 6, 474, 65). The coordinate determination module 112 is configured to calculate the coordinates of each child GUI element by factoring in the position of the root element. For example, in order to calculate the absolute coordinates of TextView, the coordinates must be moved horizontally to the right (+0) based on the left coordinate of the root LinearLayout and should be moved down (+50) based on the top coordinate of the root LinearLayout.

The system 100 further includes an identification module 104 which is configured to obtain the information from the layout parsing module 102 and identify input fields that contain sensitive information. The identification module 104 may be configured to first analyze the attributes of the input fields. For example, each GUI widget has a few attributes that decide how it will be rendered. Certain attributes may indicate that the GUI widget contains sensitive information. For instance, many apps require a user to provide a password in order to log into the software application. Passwords may generally be considered a sensitive user input.

Most smartphone platforms provide standard types of input fields to accept a password and the types are typically specified as attributes in the XML code. For example, the input field for a password may be assigned attributes such as android:inputType="textPassword". The identification module 104 is configured to review the attribute and determine that an input field which includes the attribute of a password is a sensitive user input field. The identification module 104 may be configured to identify other attributes as indicating a sensitive user input field.

The input field may also contain a hint, such as a tooltip, which guides users to input data in the field. As an example, the text "Please enter your password" may be displayed in association with an input field that receives a password.

In a preferred embodiment, the identification module 104 includes a sensitive keyword database 114 which includes keywords for hints which generally indicate a sensitive user input for the input box. The sensitive keyword database 114 may be generated by crawling all texts in resource files such as layout files and string resource files from a large number of software applications and collecting the text to form a string-line list. In one embodiment, the text is collected based on the presence of the newline character (\n). A single-word list may be extracted from a string-line list. The single-word list may then be inspected to identify sensitive keywords. The string-line list and the single-word list may be sorted based on the frequencies of the string lines and words.

In a preferred embodiment, natural language processing ("NLP") techniques are utilized to analyze the grammatical structure of the text. Based on the NLP analysis, the noun and noun phrases from the top 5000 frequent string lines of the string-line list may be extracted. In one embodiment, a Stanford parser is employed to parse each string line into a syntactic tree and identify noun and noun phrases. For the single-word list, words that are not nouns may be filtered out. The extracted list may then be manually inspected and sensitive keywords may be identified. The NLP techniques may then be employed to other words, such as frequent two-word and three-word phrases and sensitive keywords from the extracted list may be identified. The sensitive keyword database 114 may be expanded by searching the string-line list and single-word list using the identified words. Synonyms of the keywords may also be used to expand the sensitive keyword database 114. The sensitive keywords may then be classified into categories.

The identification module 104 may be configured to review any hints and compare the text of the hints with the sensitive keyword database 114 to determine whether one or more of the hint terms are included in the sensitive keyword database. The identification module 104 may be configured to identify an input field which includes a hint term that is contained in the sensitive keyword database 114 as being a sensitive user input field.

The identification module 104 may also be configured to identify an input field as containing sensitive information even if it does not have an attribute or hint that is indicative of a sensitive information input field. The identification module 104 is configured to review text labels that describe the purpose of an input field to determine whether the input field is for sensitive information. The identification module 104 includes a distance determination module 116 which utilizes the absolute coordinates of the text and the input fields determined by the coordinate determination module 112 and is configured to determine the distance between an input field and the text label.

In a preferred embodiment, the identification module 104 is configured to compute scores for each pair of a text label and an input field based on their distances and relative positions in order to determine which text label is associated with a specific input field. For a given input field, the text label that has the smallest score is selected and the text in the text label is compared to the sensitive keyword database 114 to determine the sensitiveness of the input field.

In one embodiment, the distance determination module 116 is configured to determine the distance between the input fields and text by dividing the plane of the UI layout into nine partitions based on the boundary of the input field. The input field may preferably be placed in the central partition. Each text label may be placed in one or more partitions. A score for a pixel may be determined by the distance determination module 116. The score for a pixel may be comprised of a Euclidean distance from the pixel to the input field. The distance is computed using the absolute coordinates. The score may also include a weighted value based on the relative positions of the input fields and the text. For example, if a layout of the software application is top-down and left-right arranged, the text label that describes the input field is most frequently placed at the left or somewhat less frequently on the top of the input field. Therefore, the smallest weight values may be assigned to the pixel in the left partition and the second smallest is assigned to the top partition.

After the association of a text label with an input field is determined by the identification module 104, the text label is compared to the sensitive keywords database 114 to determine whether the input field is for sensitive information.

Once the identification module 104 completes its analysis of the parsed information from the software application, the identification module is configured to output a sensitive input fields list 118. In a preferred embodiment, the sensitive input fields list may be in the form of a contextual ID pair <Layout_ID, Widget_ID> which represents the ID of the layout that contains the input field and the ID of the input field.

The taint analysis module 120 is configured to receive the sensitive input fields list 118 and detect information leaks of the values of the input fields. The taint analysis module 120 may be configured to utilize the binding mechanism in application program interface ("API") files provided for the operating system to associate the sensitive input fields with widget variables. For example, the binding mechanism may comprise APIs provided for the development kit of an operating system which load the UI layout and bind the UI elements with the code. The widget variables are the variables that store the values of the input fields and which are bound to the input fields.

The taint analysis module 120 is configured to identify widget variables for the sensitive input fields. The taint analysis module 120 may be configured to search for method calls that obtain values from the input fields through the widget variables. In one embodiment, the taint analysis module 120 is configured to search the entire code of a software application for specific method calls and compare the arguments for the method calls to the widget IDs of the sensitive input fields. However, the code for a software application may assign the same widget ID to GUI widgets in different layout files. In order to avoid duplicate widgets, the taint analysis module 120 may be configured to associate the widget variables with their corresponding layouts.

In one embodiment, the taint analysis module 120 is configured to identify the last method call along a program path which leads to the definition of the widget variable in order to determine which UI layout is associated with a specific widget variable. The taint analysis module 120 may identify the activity object from the definition of the widget variable and compute an inter-procedural backward slicing of an activity object. The taint analysis module 120 may then be configured to search the slice backwardly for the method call and use the argument as the layout ID.

A sink is an output channel for the sensitive information which may result in the sensitive information being made public. In one embodiment, the taint analysis module 120 is configured to utilize a pre-defined sink database or dataset 122 to identify the sink locations in the code of the software application based on the API's specified in the sink dataset. The taint analysis module 120 is configured to utilize the identified sink locations and the source locations to perform a taint analysis to detect information leaks for the sensitive input fields.

The taint analysis module 120 may be configured to generate a report 124 based on the taint analysis. The taint analysis module may be configured to notify the user of information leaks in the sensitive input fields by transmission of the report 124 or via other notification means such as a visual or aural signal. The notification allows the user to avoid use of the software application for improved privacy and security.

In the embodiment shown in FIG. 1, the layout parsing module 102, identification module 104 and the taint analysis module 120 and their components are provided as software that is integrated within the memory 130 of the system. However, as shown in FIG. 3, the layout parsing module 102, identification module 104 and the taint analysis module 120 may comprise hardware components. For example, in certain embodiments, the modules may comprise circuits, such as logic circuits, or other types of hardware configurations known in the art.

Figure 4:
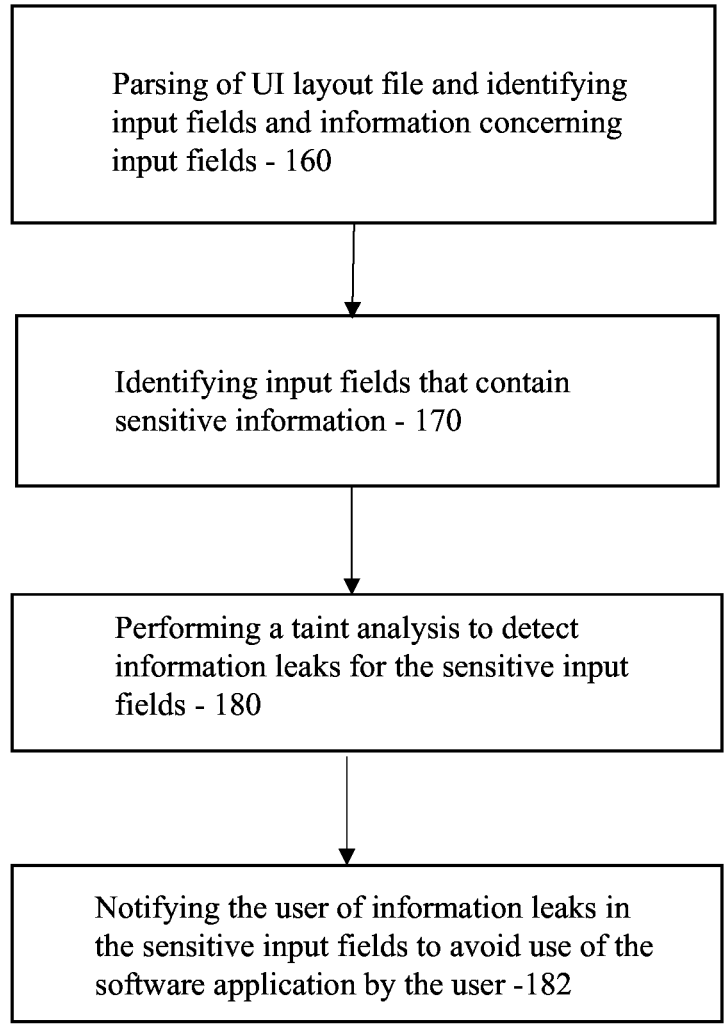
FIG. 4 is a flow diagram showing a method for detecting sensitive user input leakages in accordance with the present principles.
Figure 5:
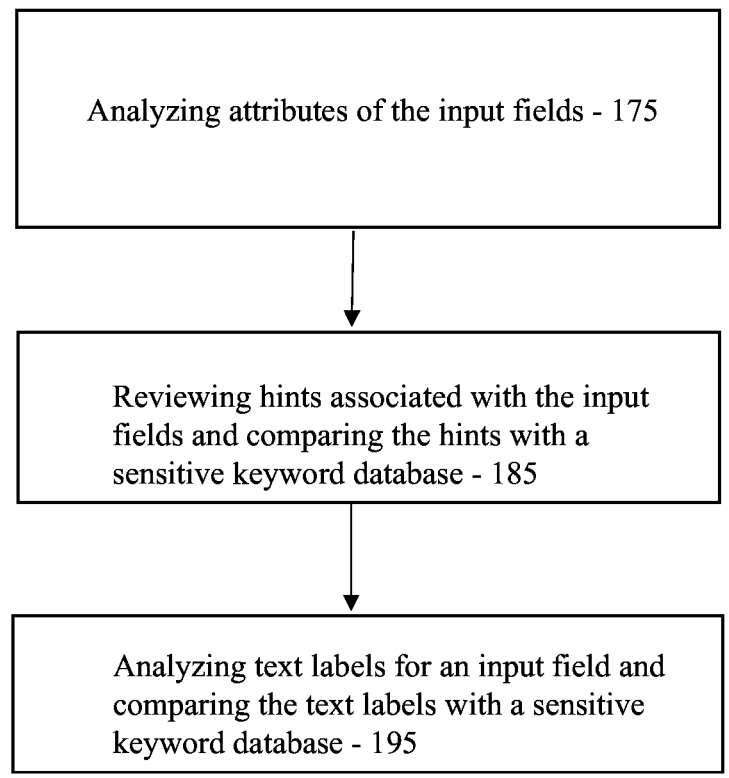
FIG. 5 is a flow diagram showing a method for identifying sensitive input fields in accordance with a preferred embodiment.

As shown in FIGS. 4-5, the present invention is also directed to methods for detecting sensitive user input leakages in software applications as previously described. The method may be performed by any combination of hardware and/or software.

Referring to FIG. 4, a method for detecting sensitive user input leakages in software applications is illustratively shown in accordance with the present principles. In block 160, the UI layout file of the software application is parsed and the UI is rendered in order to identify input fields and obtain information concerning the input fields from the UI layout file. The information may include attributes, hints, text labels and absolute coordinates. As previously discussed in detail with respect to the system 100, the UI layout file is preferably rendered in a manner that simulates the UI being dynamically rendered to the user during normal operation.

In block 170, input fields that contain sensitive information are identified and a list may be generated. Referring to FIG. 5, as previously discussed in detail with respect to the system 100, the input fields that contain sensitive information may be identified by analyzing 175 the attributes of the input fields, reviewing 185 the hints associated with an input field and comparing the hints with a sensitive keyword database and analyzing 195 text labels for an input field and comparing the text labels with a sensitive keyword database.

In block 180, a taint analysis is performed based on the sensitive input fields list, such as a contextual ID of the layout and the ID of the input field, and information leaks for the sensitive input fields are detected. A report may then be generated containing the software applications with sensitive user input leakages. The user may be notified 182 of information leaks in the sensitive input fields by transmission of the report or via other notification means such as a visual or aural signal. The notification allows the user to avoid use of the software application for improved privacy and security.

While the above configuration and steps are illustratively depicted according to one embodiment of the present principles, it is contemplated that other sorts of configurations and steps may also be employed according to the present principles. While various components have been illustratively described as separate components, the components may be formed in a variety of integrated hardware or software configurations.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for detecting sensitive user input leakages in a software application comprising the steps of:
    parsing a user interface (UI) layout file of the software application to identify input fields;
    obtaining information concerning the input fields from the UI layout file;
    identifying the input fields that include sensitive information and generating a list of sensitive input fields;
    performing a taint analysis based on the list of sensitive input fields, wherein the step of performing a taint analysis comprises the step of identifying widget variables for sensitive input fields and associating the widget variables with corresponding UI layouts in order to avoid duplicate widgets;

detecting information leaks in the sensitive input fields; and notifying a user of the information leaks in the sensitive input fields to avoid use of the software application by the user.

2. The method as recited in claim 1, wherein the parsing of a UI layout file further comprises the step of rendering a UI of the UI layout file.

3. The method as recited in claim 2, wherein the UI is rendered in a manner that simulates the UI when the UI is dynamically rendered by the user during operation of the software application.

4. The method as recited in claim 1, wherein the information concerning the input fields that is obtained comprises at least one of: attributes, hints, text labels and absolute coordinates of graphical user interface elements.

5. The method as recited in claim 4, wherein the absolute coordinates of graphical user interface elements are computed based upon known absolute coordinates of a parent container and relative coordinates of the graphical user interface elements.

6. The method as recited in claim 1, wherein the step of identifying input fields that include sensitive information comprises the steps of:
analyzing attributes of the input fields;
reviewing hints associated with the input fields and comparing the hints with a sensitive keyword database; and
analyzing text labels for an input field and comparing the text labels with the sensitive keyword database.

7. The method as recited in claim 6, wherein the sensitive keyword database is generated by performing the steps of:
crawling text in resource files from a plurality of software applications to obtain a list of text;
utilizing natural language processing to analyze a grammar structure of the text in the list and generating a narrowed list by excluding certain words from the list based on the grammar structure; and
identifying sensitive keywords in the narrowed list.

8. The method as recited in claim 6, wherein the text labels are determined to be related to a specific input field by determining the distance between each of the text labels and the specific input field and the relative positions of each of the text labels and the specific input field.

9. The method as recited in claim 1, wherein a pre-defined sink dataset is utilized to identify sink locations in the software application in order to detect information leaks.

10. A system for detecting sensitive user input leakages in a software application comprising,
a processor, memory and an interface, wherein said memory is configured to store:
a layout parsing module which parses a user interface (UI) layout file of the software application to identify input fields and obtain information concerning the input fields from the UI layout file;
an identification module which identifies the input fields that contain sensitive information and generates a list of sensitive input fields; and
a taint analysis module which detects information leaks in the sensitive input fields based on the list of sensitive input fields and notifies a user of the information leaks in the sensitive input fields to avoid use of the software application by the user, wherein the taint analysis module identifies widget variables for sensitive input fields and associates the widget variables with corresponding UI layouts in order to avoid duplicate widgets.

11. The system of claim 10, wherein the layout parsing module renders a UI of the UI layout file in a manner that simulates the UI when the UI is dynamically rendered by the user during operation of the software application.

12. The system of claim 10, wherein the layout parsing module obtains information concerning the input fields from the UI layout file comprising at least one of:
attributes, hints, text labels and absolute coordinates of graphical user interface elements.

13. The system of claim 12, wherein the layout parsing module determines absolute coordinates of graphical user interface elements based upon known absolute coordinates of a parent container and relative coordinates of the graphical user interface elements.

14. The system as recited in claim 10, wherein the identification module identifies input fields that contain sensitive information by:
analyzing the attributes of the input fields;
reviewing hints associated with the input fields and comparing the hints with a sensitive keyword database; and
analyzing text labels for an input field and comparing the text labels with the sensitive keyword database.

15. The system as recited in claim 14, wherein the identification module determines that text labels are related to a specific input field by determining the distance between each of the text labels and the specific input field and the relative positions of each of the text labels and the specific input field.

16. The system as recited in claim 10, wherein the taint analysis module identifies sink locations in the software application based upon a sink database in order to detect information leaks.

17. A method for detecting sensitive user input leakages in a software application comprising the steps of:
parsing a user interface (UI) layout file of the software application to identify input fields;
obtaining information concerning the input fields from the UI layout file;
identifying the input fields that include sensitive information and generating a list of sensitive input fields;
performing a taint analysis based on the list of sensitive input fields;
detecting information leaks in the sensitive input fields; and
notifying a user of the information leaks in the sensitive input fields to avoid use of the software application by the user;
wherein the step of identifying the input fields that include sensitive information comprises the steps of:
analyzing attributes of the input fields;
reviewing hints associated with the input fields and comparing the hints with a sensitive keyword database; and
analyzing text labels for an input field and comparing the text labels with the sensitive keyword database;
wherein the sensitive keyword database is generated by performing the steps of:
crawling text in resource files from a plurality of software applications to obtain a list of text;
utilizing natural language processing to analyze a grammar structure of the text in the list and generating a narrowed list by excluding certain words from the list based on the grammar structure; and
identifying sensitive keywords in the narrowed list.

* * * * *